United States Patent [19]

Oishi

[11] Patent Number: 5,359,455
[45] Date of Patent: Oct. 25, 1994

[54] POLARIZATION FORMING OPTICAL DEVICE

[75] Inventor: Noriji Oishi, Aichi, Japan

[73] Assignee: Mitsubishi Rayon Co., Ltd., Tokyo, Japan

[21] Appl. No.: 17,968

[22] Filed: Feb. 12, 1993

Related U.S. Application Data

[63] Continuation of Ser. No. 743,425, Aug. 21, 1991, abandoned.

[30] Foreign Application Priority Data

| Dec. 26, 1989 | [JP] | Japan | 1-334896 |
| Dec. 27, 1989 | [JP] | Japan | 1-336649 |
| Jun. 4, 1990 | [JP] | Japan | 2-144528 |
| Jun. 28, 1990 | [JP] | Japan | 2-168247 |
| Oct. 1, 1990 | [JP] | Japan | 2-260521 |

[51] Int. Cl.$^5$ .................. G02B 5/30; G02B 27/28; G02F 1/1335
[52] U.S. Cl. ................... 359/487; 359/73; 359/495; 359/499
[58] Field of Search .......... 359/73, 487, 488, 494, 359/495, 496, 497, 499

[56] References Cited

U.S. PATENT DOCUMENTS

| 2,887,566 | 5/1959 | Marks | 359/487 |
| 3,153,740 | 10/1964 | Murphy | 359/487 |
| 3,510,198 | 5/1970 | Pace . | |
| 3,876,285 | 4/1975 | Schwarzmuller | 359/495 |
| 4,020,336 | 4/1977 | Linder | 359/487 |
| 4,798,448 | 1/1989 | Van Raalte . | |
| 5,042,921 | 8/1991 | Sato et al. | 359/73 |

FOREIGN PATENT DOCUMENTS

| 803797 | 10/1936 | France | 359/487 |
| 59-127019 | 7/1984 | Japan . | |
| 63-132215 | 6/1988 | Japan . | |
| 63-168622 | 7/1988 | Japan . | |
| 63-197913 | 8/1988 | Japan . | |
| 63-150922 | 10/1988 | Japan . | |
| 63-187101 | 11/1988 | Japan . | |
| 63-271313 | 11/1988 | Japan . | |
| 743502 | 1/1956 | United Kingdom . | |

OTHER PUBLICATIONS

"Geometric, Physical, and Visual Optics", by Michael P. Keating Ph.D., 1990, pp. 374 to 375.
Melles Gript Company, Optics Guide 4, 1988, pp. 15-16 to 15-17.

Primary Examiner—Martin Lerner
Attorney, Agent, or Firm—Baker & Daniels

[57] ABSTRACT

A random polarized light from a light source (305) can be changed into a linear polarized light by using a polarization beam splitter (303), a transmitting means (304) for rotating a plane of polarization at 90°, reflectors (308) and a first prism formed plate (302). Further, a beam width of the linear polarized light thus obtained can be reduced by using a reflecting surface (307) and a second prism formed plate (301).

15 Claims, 15 Drawing Sheets

F I G. 1
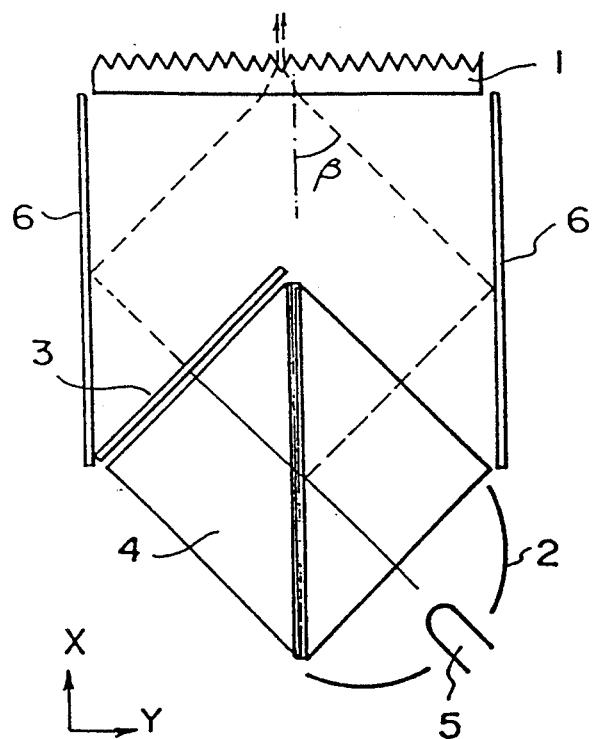
F I G. 2
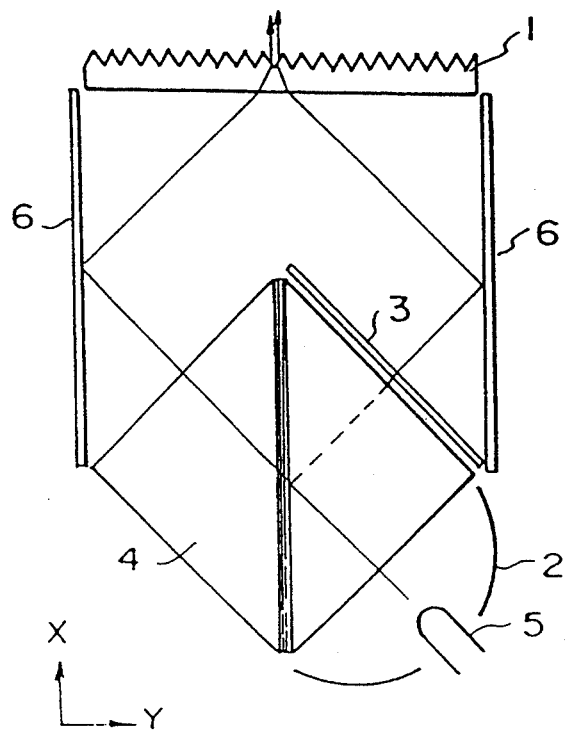

F I G. 20
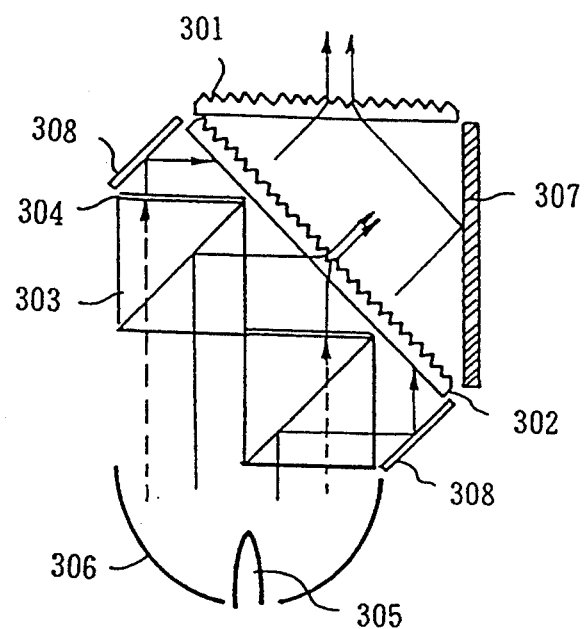
F I G. 21
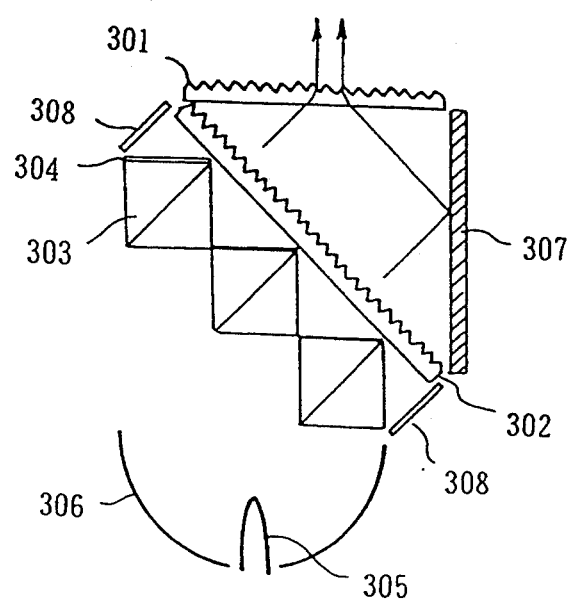

F I G. 30
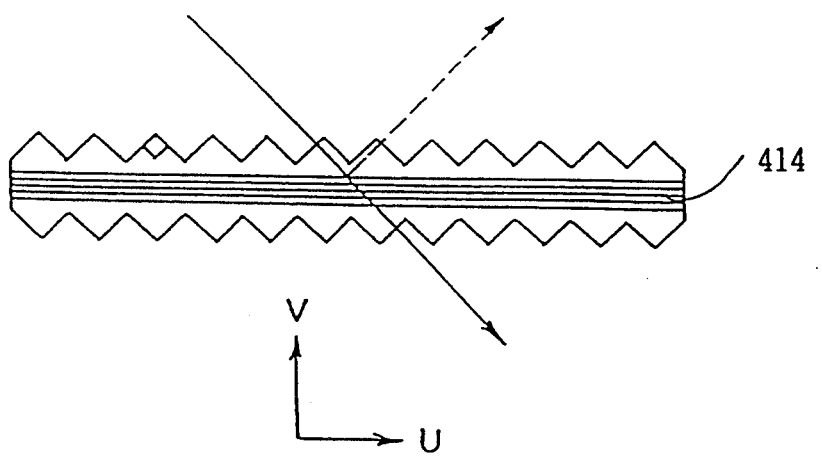
F I G. 31
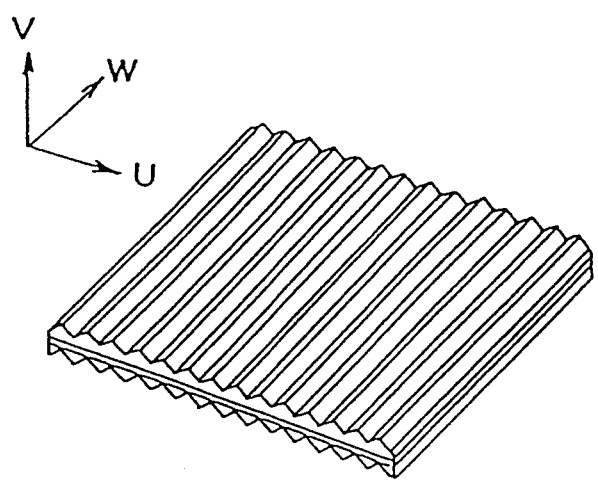

LINEAR POLARIZED LIGHT

RANDOM POLARIZED LIGHT

POLARIZATION FORMING OPTICAL DEVICE

This is a continuation of application Ser. No. 07/743,425, filed Aug. 21, 1991 now abandoned.

TECHNICAL FIELD

The present invention relates to a polarization forming optical device for changing a light beam having a random polarization characteristic into a linear polarized light.

Background Art

It is known that a linear polarized light beam is useful for a light source of a liquid crystal projector or illumination such that imaging of a light source is undesired (e.g., illumination through a glass surface or a water surface).

Conventionally, such a linear polarized light beam is formed by transmitting light from a light source having a random polarization characteristic ( e.g., tungsten lamp, halogen lamp, xenon lamp or metal halide lamp) through a polarizing plate. Upon transmission of the incident light from the light source through the polarizing plate, a polarized light component having a plane of polarization perpendicular to that of a transmitted light is cut off by the polarizing plate. Therefore, a light quantity ( transmitted light quantity) to be utilized is reduced to at most 50% of a light quantity from the light source.

Thus, the polarization forming optical device employing the polarizing plate has a problem of large loss of light.

To avoid such a problem, it has been proposed that the light from the light source is first divided into two linear polarized light components by means of a polarization beam splitter and then a plane of polarization of one of the two linear polarized light components is rotated at 90° to follow joining with the other light component.

Such a method is described in Japanese Patent Laid-open Publication No. 63-197913, Japanese Utility Model Laid-open Publication No. 63-187101, Japanese Patent Laid-open Publication Nos. 63-271313 and 63-168622, and Japanese Utility Model Laid-open Publication No. 63-150922.

In the method described in Japanese Patent Laid-open Publication No. 63-197913 and Japanese Utility Model Laid-open Publication No. 63-187101, one of the two linear polarized light components divided by the polarization beam splitter is successively reflected on two reflecting surfaces to thereby rotate the plane of polarization. Such rotation of the plane of polarization by reflection is preferable from viewpoint of non-dependency upon a wavelength. However, it is not preferable that a size of the device becomes large, so as to ensure an optical path of a reflected light.

In the method described in Japanese Patent Laid-open Publication No. 63-271313 and Japanese Utility Model Laid-open Publication No. 63-150922, a size of the device is enlarged. Accordingly, the application of the device is greatly limited.

In the method described in Japanese Patent Laid-open Publication No. 63-168622, a TN liquid crystal is used to rotate the plane of polarization, so that the above-mentioned function is realized with a relatively compact and simple construction . However , two light beams divided by the polarization beam splitter diverge to form an outgoing light beam. Therefore, a width of the outgoing light beam becomes twice that of the incident light beam. Further, there is a problem of non-uniformity of brightness of the outgoing light beam.

Disclosure of Invention

It is an object of the present invention to provide a polarization forming optical device for forming a linear polarized light from a random polarized light source, which can be made compact and can eliminate or suppress expansion of a beam width and/or non-uniformity of brightness of an outgoing light beam.

According to a first aspect of the present invention, there is provided a polarization forming optical device comprising a polarization beam splitter for reflecting one of a p-polarization component and an s-polarization component of light emitted from a light source and for transmitting the other; transmitting means for rotating a plane of polarization of one of a reflected light and a transmitted light from said polarization beam splitter at 90°; a prism formed plate having a plurality of prism rows on one surface thereof for transmitting and synthesizing the reflected light and the transmitted light as two divided light beams from said polarization beam splitter; and first and second light reflecting means for guiding said two divided light beams from said polarization beam splitter to said prism formed plate on an opposite side of said one surface formed with said prism rows, so as to overlap the reflected light and the transmitted light each other on the other surface of said prism formed plate.

With this arrangement according to the first aspect, the light from the light source is divided into two linear polarized light components by the polarization beam splitter. After a plane of polarization of one of the two light components is rotated at 90° by the transmitting means, this light component is synthesized with the other light component. After the planes of polarization of the two light components are made coincident with each other, the two light components are guided to the prism formed plate by the first and second reflecting means such as reflecting surfaces. Then, the two light components are made parallel to each other by the prism rows formed on the light outgoing surface of the prism formed plate. Thus, a linear polarized light beam outgoes from the light outgoing surface of the prism formed plate.

According to a second aspect of the present invention, there is provided a polarization forming optical device comprising dividing means for dividing light emitted from a light source into two light beams advancing in two different directions; first and second polarization beam splitters for reflecting one of a p-polarization component and an s-polarization component of said two light beams and for transmitting the other; first and second transmitting means for rotating a plane of polarization of one of a reflected light and a transmitted light from said first and second polarization beam splitters at 90°; a prism formed plate having a plurality of prism rows on one surface thereof for transmitting and synthesizing the reflected light and the transmitted light as four divided light beams from said first and second polarization beam splitters; and first and second light reflecting means for guiding said four divided light beams from said first and second polarization beam splitters to said prism formed plate on an opposite side of said one surface formed with said prism rows, so as to overlap the reflected light from said first polarization beam splitter and the transmitted light from said second polarization beam splitter each other and also overlap the transmitted light from said first polarization beam splitter and the reflected light from said second polarization beam splitter each other on the other surface of said prism formed plate.

With this arrangement according to the second aspect, the light from the light source is first divided into two light beams advancing in two different directions by the dividing means. Each of the two light beams is further divided into two linear polarized light components by each of the first and second polarization beam splitters. A plane of polarization of one of the two light components is rotated at 90° by each of the first and second transmitting means. Thereafter, the two light beams subjected to the rotation of the plane of polarization are synthesized with the remaining two light beams not subjected to the rotation of the plane of polarization. After the planes of polarization of these four light beams are made coincident with one another, the four light beams are guided to the prism formed plate by the first and second reflecting means such as reflecting surfaces. Then, the four light beams are made parallel to one another by the prism rows formed on the light outgoing surface of the prism formed plate. Thus, a linear polarized light beam outgoes from the light outgoing surface of the prism formed plate.

According to a third aspect of the present invention, there is provided a polarization forming optical device comprising a polarization beam splitter for reflecting one of a p-polarization component and an s-polarization component of light emitted from a light source and for transmitting the other; transmitting means for transmitting a reflected light or a transmitted light from said polarization beam splitter and for rotating a plane of polarization of an incident light at 90°; a reflecting mirror for changing an advancing direction of one of said reflected light and said transmitted light from said polarization beam splitter in such a manner that said reflected light intersects said transmitted light; and a prism for making advancing directions of said reflected light and said transmitted light intersected coincident with each other to synthesize said reflected light and said transmitted light.

With this arrangement according to the third aspect, the light from the light source is divided into two linear polarized light components by the polarization beam splitter. After a plane of polarization of one of the two light components is rotated at 90° by the transmitting means, this light component is synthesized with the other light component. That is, the advancing direction of one of the light component subjected to the rotation of the plane of polarization and the other component from the polarization beam splitter is changed by using the reflecting mirror to intersect both the polarized light beams. At such an intersecting position, both the polarized light beams are synthesized with each other to obtain a single linear polarized light beam. Accordingly, expansion of a beam width due to the formation of the polarized light beams can be suppressed. Further, by using a synthesizer prism having a plurality of microprism rows as means for synthesizing the polarized light beams, the generation of non-uniformity of brightness of the outgoing light beam can be avoided.

According to a fourth aspect of the present invention, there is provided a polarization forming optical device comprising a polarizing section and a light beam width reducing section, wherein:

said polarizing section comprises a polarization beam splitter for reflecting one of a p-polarization component and an s-polarization component of light emitted from a light source and for transmitting the other; transmitting means for transmitting one of a reflected light and a transmitted light from said polarization beam splitter and for rotating a plane of polarization at 90°; a first prism formed plate having one surface formed with a plurality of prism rows for making an advancing direction of a transmitted light from said transmitting means coincident with an advancing direction of the other of said reflected light and said transmitted light from said polarization beam splitter to synthesize the two light beams from said transmitting means and said polarization beam splitter; and a pair of reflectors for reflecting a part of the other of said reflected light and said transmitted light from said polarization beam splitter and also for reflecting a part of said transmitted light from said transmitting means, so as to guide both the parts to said first prism formed plate; and said light beam width reducing section comprises a reflecting surface for reflecting at least one part of a synthesized light from said first prism formed plate; and a second prism formed plate having one surface formed with a plurality of prism rows for making an advancing direction of a reflected light from said reflecting surface coincident with an advancing direction of the other part of said synthesized light from said first prism formed plate to synthesize said reflected light and said other part.

With this arrangement according to the fourth aspect, the light from the light source is divided into two linear polarized light components by the polarization beam splitter. After a plane of polarization of one of the two light components is rotated at 90° by the transmitting means, this light component is synthesized with the other light component by the first prism formed plate. That is, the transmitted light from the transmitting means subjected to the rotation of the plane of polarization is synthesized with the other of the reflected light and the transmitted light from the polarization beam splitter by the first prism formed plate, wherein the advancing directions of both the light beams are made coincident with each other by the first prism formed plate. However, before both the light beams enter the first prism formed plate, a part of the transmitted light from the transmitting means and a part of the other of the reflected light and the transmitted light from the polarization beam splitter are reflected by the two reflectors. Then, the two outgoing light beams from the first prism formed plate are synthesized again with each other by the second prism formed plate in the light beam width reducing section. Accordingly, expansion of a beam width due to the formation of the polarized light beams can be eliminated. Further, by using the second prism formed plate having a plurality of microprism rows, the generation of non-uniformity of brightness of the outgoing light beam can be avoided.

According to a fifth aspect of the present invention, there is provided a polarization forming optical device comprising a light beam width reducing section and a polarizing section, wherein:

said light beam width reducing section comprises a reflecting member for reflecting a part of light emitted from a light source; and a first prism formed plate having one surface formed with a plurality of prism rows for making an advancing direction of a reflected light from said reflecting member coincident with an advancing direction of the other part of said light from said light source to synthesize said reflected light and said other part; and said polarizing section comprises a polarization beam splitter for reflecting one of a p-polarization component and an s-polarization component of a synthesized light from said light beam width reducing section and for transmitting the other; transmitting means for receiving one of a reflected light and a transmitted light from said polarization beam splitter and for rotating a plane of polarization at 90° to obtain a transmitted light component; a second prism formed plate having one surface formed with a plurality of prism rows for making an advancing direction of said transmitted light component from said transmitting means coincident with an advancing direction of the other of said reflected light and said transmitted light from said polarization beam splitter to synthesize said transmitted light component and said other; and a reflecting member for conducting at least one part of said transmitted light component from said transmitting means and at least one part of said other of said reflected light and said transmitted light from said polarization beam splitter.

There is further provided a polarization forming optical device comprising a plurality of repeating units each identical with said device according to the fifth aspect, wherein said plurality of repeating units are juxtaposed so as to make the outgoing light beams from the light beam width reducing sections of the repeating units parallel to one another, and said reflecting member in said polarizing section according to the fifth aspect is eliminated.

With this arrangement according to the fifth aspect, the light from the light source is first reduced in beam width in the light beam width reducing section, and is then divided into two linear polarized light components by the polarization beam splitter. After a plane of polarization of one of the two light components is rotated at 90° by the transmitting means, this light component is synthesized with the other light component by the second prism formed plate. That is, the transmitted light from the transmitting means subjected to the rotation of the plane of polarization is synthesized with the other of the reflected light and the transmitted light from the polarization beam splitter by the second prism formed plate, wherein the advancing directions of both the light beams are made coincident with each other by the second prism formed plate. Even though expansion of a beam width in the polarizing section is generated, this expansion can be canceled because the beam width is reduced in the light beam width reducing section provided before the polarizing section. Further, by using the second prism formed plate having a plurality of microprism rows, the generation of non-uniformity of brightness of the outgoing light beam can be avoided.

As an example of the transmitting means in the present invention, a ½ wave plate is employed. The ½ wave plate is arranged in such a manner that an angle defined between an optic axis of the ½ wave plate and a plane of polarization of an incident light is 45°. The ½ wave plate may be obtained by forming a crystal of an inorganic substance such as mica or rock crystal to a predetermined thickness or by drawing a high-molecular film indicating a double refraction such as polycarbonate or polyester to a predetermined magnitude. However, as the operation of the ½ wave plate depends on a wavelength, it is not preferable in the case of using a white light.

As another example of the transmitting means, a TN liquid crystal cell is utilized. Such a TN liquid crystal cell is composed of a pair of transparent substrates uniaxially oriented by rubbing or the like and opposed to each other so that orientation axes are perpendicularly intersected each other, and a nematic liquid crystal filled between the transparent substrates. A molecular axis of a liquid crystal molecule forms a helical structure twisted at 90° between the transparent substrates, so that a plane of polarization of an incident polarized light is rotated along this helical structure. Accordingly, the operation of the TN liquid crystal cell is related to a direction of the incident light. That is, when the operation in one direction is the conversion from an s-polarized light to a p-polarized light, the operation in the other direction is limited to the conversion from a p-polarized light to an s-polarized light.

An example of the polarization beam splitter comprises two transparent plates and a multi-layer polarizing film interposed between said two transparent plates, each of said transparent plates being formed on its outer side surface with a plurality of prisms arranged in parallel rows, each of said prisms having two adjacent surfaces inclined at 45° with respect to a normal to an inner side surface of each said transparent plate and inclined at 90° with respect to each other. Further, another example of the polarization beam splitter comprises a single transparent plate, a rectangular prism and a multi-layer polarizing film interposed between an inner side surface of said transparent plate and a slant surface of said rectangular prism, said transparent plate being formed on its outer side surface with a plurality of prisms arranged in parallel rows, each of said prisms having two adjacent surfaces inclined at 45° with respect to a normal to said inner side surface of said transparent plate and inclined at 90° with respect to each other.

BRIEF DESCRIPTION OF DRAWINGS

FIGS. 1, 2 and 6 to 8 are plan views of the polarization forming optical device according to the first aspect of the present invention;

FIGS. 18 to 21 and 28 are plan views of the polarization forming optical device according to the fourth aspect of the present invention;

FIGS. 30, 31, 32 and 33 are views illustrating modifications of the polarization beam splitter.

BEST MODE FOR CARRYING OUT THE INVENTION

There will now be described some preferred embodiments of the present invention. In the following preferred embodiments, a ½ wave plate is employed, but it may be replaced by a TN liquid crystal cell.

(I)

Figure 3:
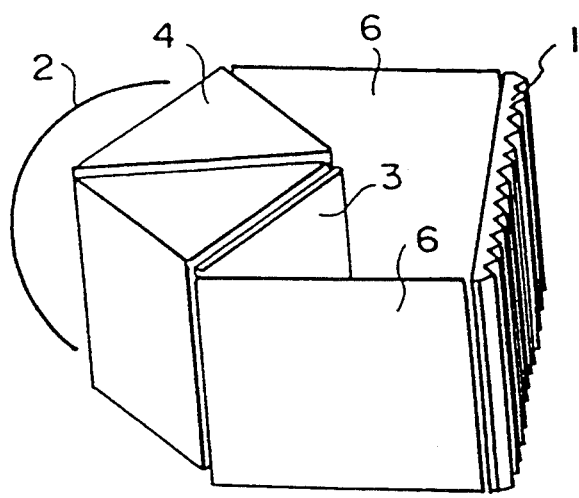
FIG. 3 is a perspective view of FIG. 1.

FIGS. 1 and 2 are plan views of preferred embodiments of the present invention, and FIG. 3 is a perspective view of FIG. 1.

In the preferred embodiment shown in FIG. 1, rays of light from a light source 5 are made parallel by a curved mirror 2, and then enter a prism type polarization beam splitter 4. A p-polarization component (shown by a solid line in the drawing) of the incident light on the polarization beam splitter 4 is transmitted through the polarization beam splitter 4, and a plane of polarization of the p-polarization component is rotated at 90° by a ½ wave plate 3 to obtain an s-polarized light. The s-polarized light thus obtained is reflected by a first reflecting mirror 6, and then enters a prism formed plate 1. The incident light on the prism formed plate 1 is refracted by prisms of the prism formed plate 1 to outgo therefrom. On the other hand, an s-polarization component (shown by a dashed line in the drawing) of the incident light on the polarization beam splitter 4 is reflected by the polarization beam splitter 4. The s-polarization component thus reflected by the polarization beam splitter 4 is further reflected by a second reflecting mirror 6, and then enters the prism formed plate 1. The incident light on the prism formed plate 1 is refracted by the prisms of the prism formed plate 1 to outgo therefrom.

Thus, the two polarization components of the light from the light source 5 are made into an outgoing light beam as an s-polarized light beam.

The preferred embodiment shown in FIG. 2 is similar to the preferred embodiment shown in FIG. 1 except that the ½ wave plate 3 is located in an optical path of the s-polarization component to be reflected by the polarization beam splitter 4. In this case, the outgoing light beam becomes a p-polarized light beam.

In the preferred embodiments shown in FIGS. 1 and 2, the two reflecting mirrors 6 and the prism formed plate 1 are so set as to overlap the light component transmitted through the polarization beam splitter 4 and the light component reflected by the polarization beam splitter 4 each other on the prism formed plate 1.

Figure 4:
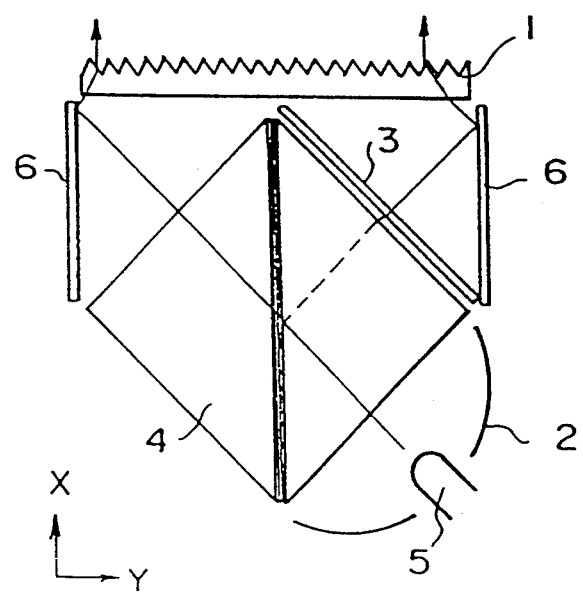
FIG. 4 is a plan view of a comparative example in relation to FIG. 2.

In the case that the setting position of the prism formed plate 1 is changed so as to make the device compact as shown in FIG. 4 which is a comparative example, the light component transmitted through the polarization beam splitter 4 outgoes from a left half of the prism formed plate 1, while the light component reflected by the polarization beam splitter 4 outgoes from a right half of the prism formed plate 1. However, these two light components are different from each other in intensity and spectrum to cause non-uniformity of the outgoing light beam for the following reasons.

(1) A reflectance of the polarization beam splitter 4 for the s-polarized light is not strictly equal to a transmittance of the polarization beam splitter 4 for the p-polarized light.

(2) There is a loss of light due to reflection and absorption by the ½ wave plate 3.

(3) The ½ wave plate 3 has a dependency of a phase difference angle on a wavelength.

In the preferred embodiments shown in FIGS. 1 and 2, such a problem as in FIG. 4 does not occur since the two light components are uniformly mixed together on the outgoing surface (i.e., the prism formed plate 1).

The shape of each prism of the prism formed plate 1 is designed in the following manner. That is, as apparent from FIG. 5, in order to obtain an outgoing light beam parallel to a normal of the prism formed plate 1, an angle $\theta$ defined between a surface of each prism and the normal of the prism formed plate 1 is so selected as to satisfy the following equation (1)

$$n_1 \sin \alpha = \sin \beta$$

$$n_1 \cos (\alpha + \theta) = \cos \theta \qquad (1)$$

where $n_1$ represents a refractive index of the prism formed plate 1, and $\beta$ represents an incident angle of the light entering the prism formed plate 1.

Figure 5:
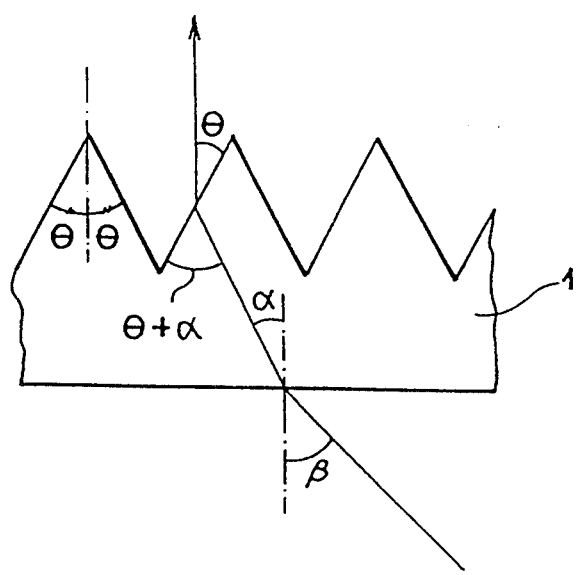
FIGS. 5 and 15 are enlarged plan views of a part of the prism formed plate, illustrating a light transmitting condition.
Figure 15:
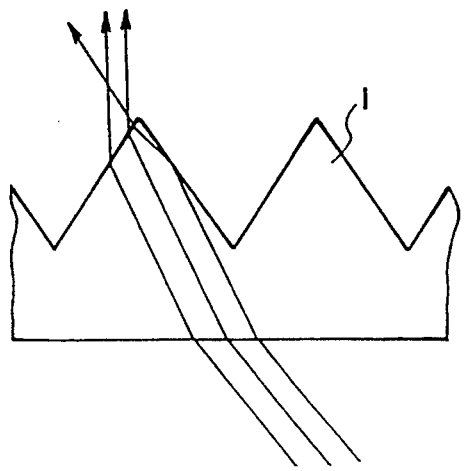

Further, in FIG. 5, it is preferable that $n_1$ and $\beta$ are to be selected so as to satisfy $\alpha \geq \theta$. If $\alpha < \theta$, a part of the incident light rays is reflected on the other inclined surface of the prism to change an advancing direction as shown in FIG. 15. As a result, the rays of the outgoing light are not made parallel to cause a reduction in efficiency.

Figure 6:
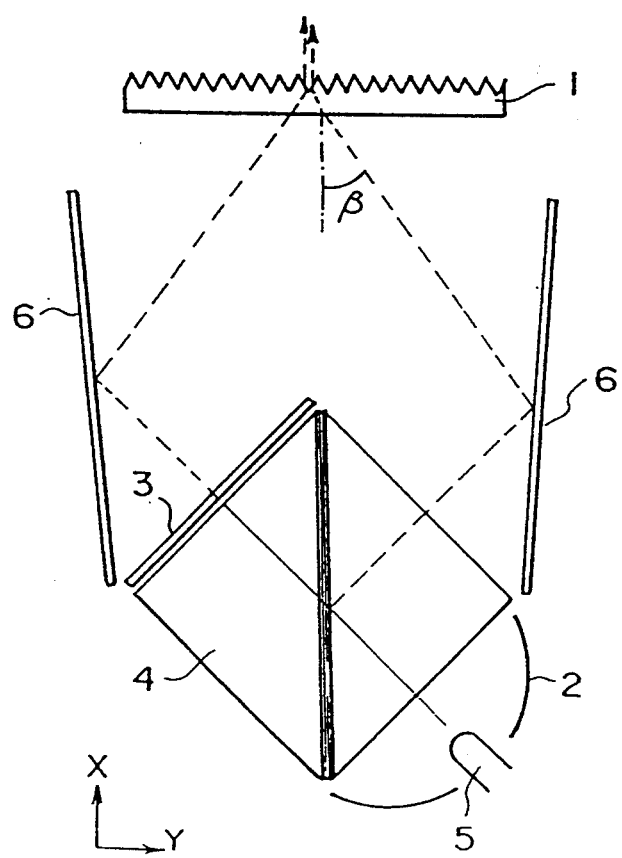
Figure 7:
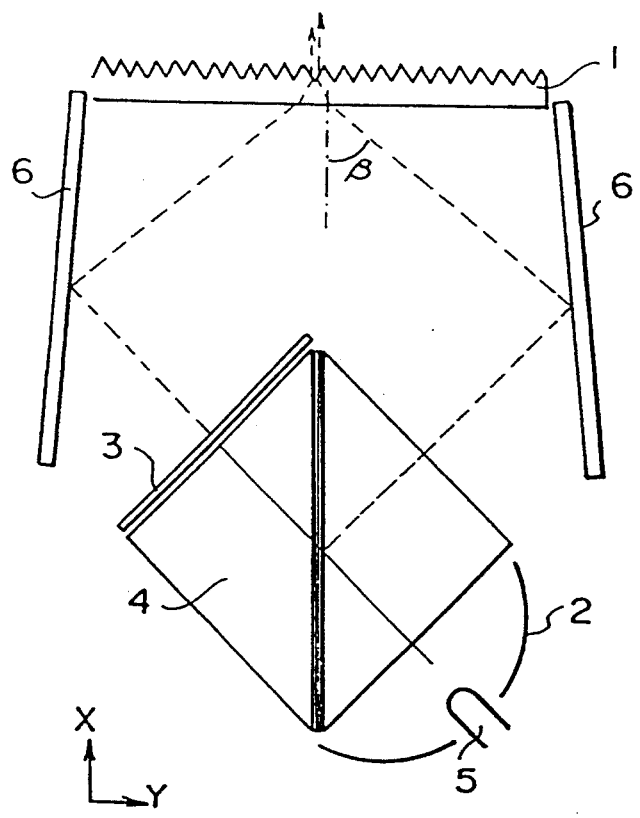

In the preferred embodiments shown in FIGS. 1 and 2, $\beta = 45°$ is set. However, the incident angle $\beta$ may be changed by inclining the reflecting mirrors 6. FIG. 6 shows a preferred embodiment in the case that $\beta < 45°$ is set, and FIG. 7 shows a preferred embodiment in the case that $\beta > 45°$ is set.

Figure 8:
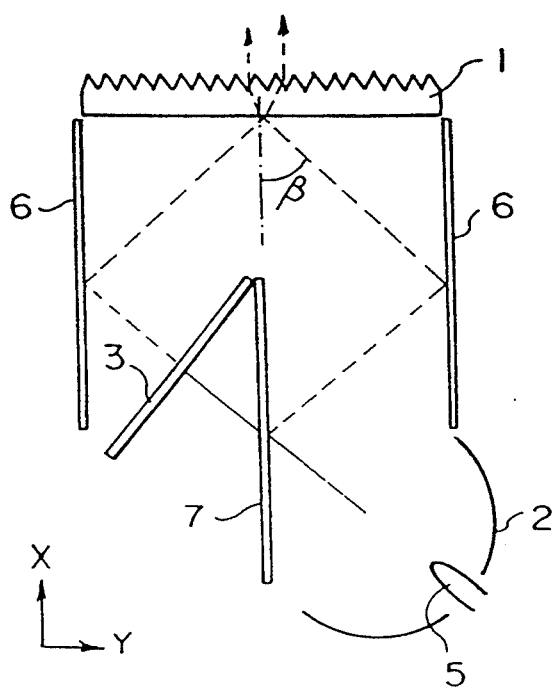

FIG. 8 shows a preferred embodiment employing a mirror type polarization beam splitter 7. The employment of the mirror type polarization beam splitter 7 allows arbitrary selection of the incident angle $\beta$. That is, the incident angle $\beta$ can be arbitrarily selected with the two reflecting mirrors 6 maintained in parallel relationship. In the preferred embodiment shown in FIG. 8, $\beta > 45°$ is set.

In the present invention, a width of the outgoing light beam is increased in a direction of Y-axis by $(1/\cos \beta)$ times a width of the incident light beam. In the preferred embodiments shown in FIGS. 1 and 2, $\beta = 45°$ is set, so that the increasing rate in width of the outgoing light beam becomes $(1/\cos 45°) = 1.414$. On the other hand, the width of the outgoing light beam in the aforementioned prior art device described in Japanese Patent Laid-open Publication No. 63-168622 is increased by two times. Therefore, in comparison with this prior art device, it is appreciated that the width of the outgoing light beam according to the preferred embodiments shown in FIGS. 1 and 2 is reduced by about 30%.

(II)

The following preferred embodiments employ a prism formed plate formed from a transparent plate having a plurality of microprism rows on one surface thereof, so as to divide a random polarized light from a light source into two light beams advancing in two different directions. With this construction, the device can be made compact. Such a prism formed plate may be of course replaced by a single prism exhibiting substantially the same function.

Figure 9:
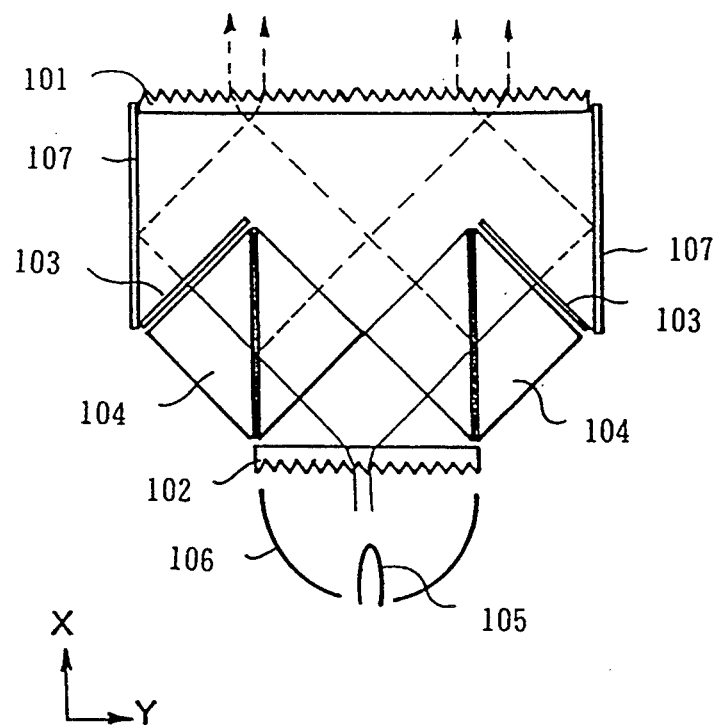
FIGS. 9, 10 and 14 are plan views of the polarization forming optical device according to the second aspect of the present invention.
Figure 10:
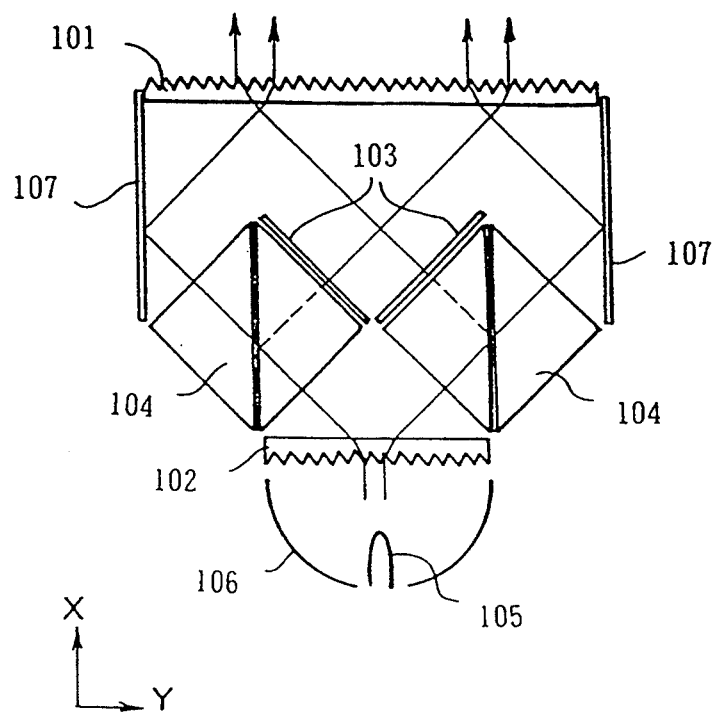
Figure 11:
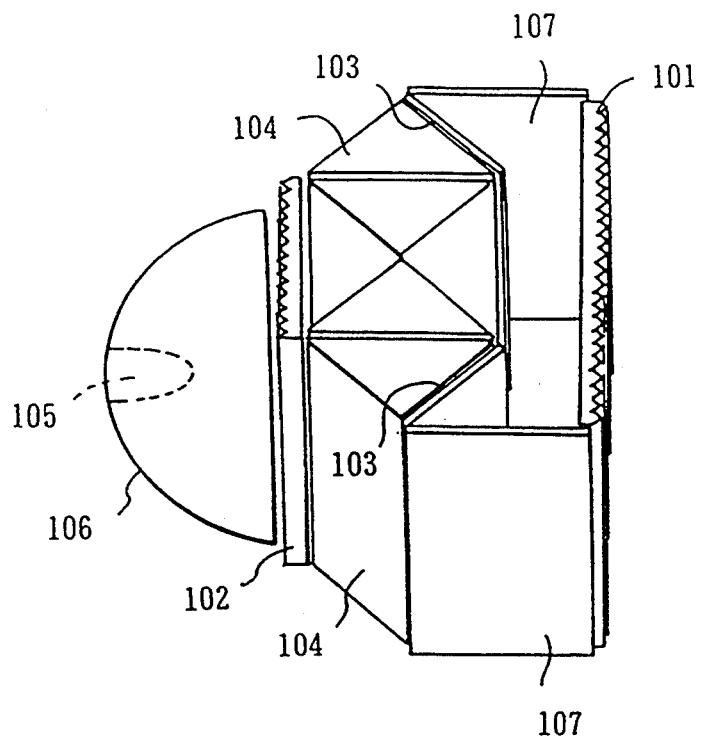
FIG. 11 is a perspective view of FIG. 9.

FIGS. 9 and 10 are plan views of preferred embodiments of the present invention, and FIG. 11 is a perspective view of FIG. 9.

In the preferred embodiment shown in FIG. 9, rays of light from a light source 105 are made parallel by a curved mirror 106, and then divided into two light beams advancing in two different directions by a prism formed plate 102 having a plurality of prism rows on one surface thereof. The divided light beams enter first and second prism type polarization beam splitters 104. A p-polarization component (shown by a solid line in the drawing) of each incident light on the polarization beam splitters 104 is transmitted through the polarization beam splitters 104, and a plane of polarization of each p-polarization component is rotated at 90° by first and second ½ wave plates 103 to obtain an s-polarization component. Then, the s-polarization component is reflected by first and second reflecting mirrors 107 to enter a prism formed plate 101 having a plurality of prisms. The incident light beams on the prism formed plate 101 are refracted by the prisms of the prism formed plate 101 to outgo therefrom. On the other hand, an s-polarization component (shown by a dashed line in the drawing) of the incident light beams on the polarization beam splitters 104 is reflected by the polarization beam splitters 104, and then enters the prism formed plate 101. The incident light beams on the prism formed plate 101 are refracted by the prisms of the prism formed plate 101 to outgo therefrom.

Thus, the two polarization components of the light from the light source 105 are made into an outgoing light beam as an s-polarized light beam.

In the preferred embodiment shown in FIG. 9, the two reflecting mirrors 107 are parallel to each other, and the two polarization beam splitters 104 are also parallel to each other. These reflecting mirrors 107 and polarization beam splitters 104 are disposed in perpendicular relationship to the prism formed plate 102. Accordingly, the divided light beams from the prism formed plate 102 enter the two polarization beam splitters 104 at the same incident angle (i.e., 45° in this preferred embodiment).

The preferred embodiment shown in FIG. 10 is similar to the preferred embodiment shown in FIG. 9 except that the first and second ½ wave plates 103 are located in optical paths of the respective s-polarization components to be reflected by the first and second polarization beam splitters 104. In this case, the outgoing light beam becomes a p-polarized light beam.

In the preferred embodiments shown in FIGS. 9 and 10, the two reflecting mirrors 107 and the prism formed plate 101 are so set as to overlap the two kinds of light components (i.e., the one kind of light component whose plane of polarization is rotated by the ½ wave plates 103 and the other kind of light component whose plane of polarization is not rotated by the ½ wave plates 103) each other on the prism formed plate 101. More specifically, the light component from the first polarization beam splitter 104 whose plane of polarization is rotated by the first ½ wave plate 103 and the light component from the second polarization beam splitter 104 whose plane of polarization is not rotated by the second ½ wave plate 103 overlap each other on one half of the prism formed plate 101. On the other hand, the light component from the first polarization beam splitter 104 whose plane of polarization is not rotated by the first ½ wave plate 103 and the light component from the second polarization beam splitter 104 whose plane of polarization is rotated by the second ½ wave plate 103 overlap each other on the other half of the prism formed plate 101.

Figure 12:
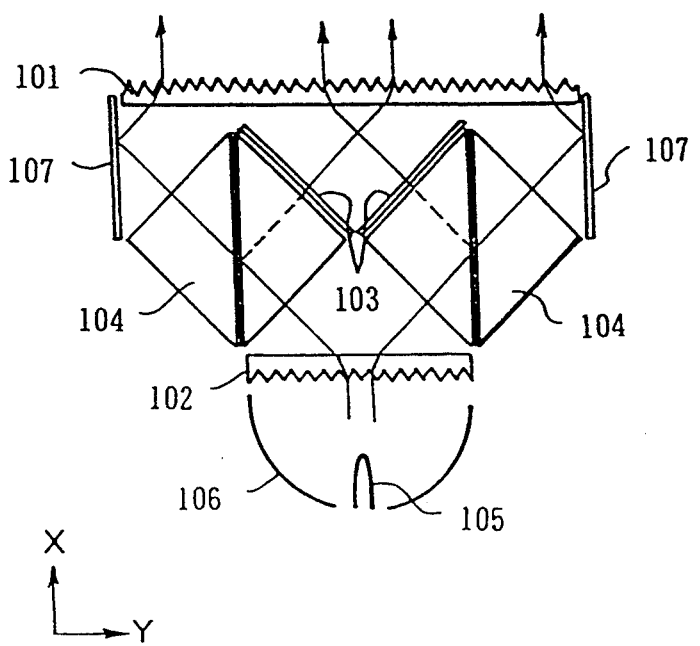
FIG. 12 is a plan view of a comparative example in relation to FIG. 10.

In the case that the setting position of the prism formed plate 101 is changed so as to make the device compact as shown in FIG. 12 which is a comparative example, the light components transmitted through the first and second polarization beam splitters 104 outgo from an outer peripheral portion of the prism formed plate 101, while the light components reflected by the first and second polarization beam splitters 104 outgo from a central portion of the prism formed plate 101. However, these two kinds of light components are different from each other in intensity and spectrum to cause non-uniformity of the outgoing light beam for the aforementioned reasons.

In the preferred embodiments shown in FIGS. 9 and 10, such a problem as in FIG. 12 does not occur since the two kinds of light components are uniformly mixed together on the outgoing surface (i.e., the prism formed plate 101).

The shape of each prism of the prism formed plate 101 is designed in accordance with the aforementioned description with reference to FIG. 5.

On the other hand, the shape of each prism of the prism formed plate 102 is designed in the following manner. That is, as apparent from FIG. 13, an angle $\delta$ defined between a surface of each prism and a normal of the prism formed plate 102 is so selected as to satisfy the following equation (2).

$$n_2 \sin \tau = \sin \beta$$

$$n_2 \cos(\tau+\delta) = \cos \delta \qquad (2)$$

where $n_2$ represents a refractive index of the prism formed plate 102.

Figure 13:
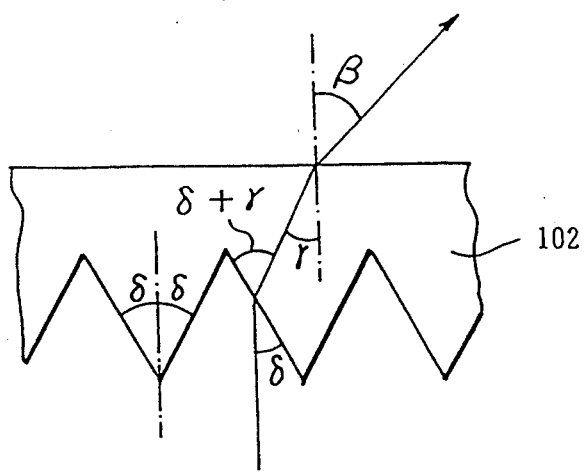
FIGS. 13 and 24 are enlarged plan views of a part of the prism formed plate, illustrating a light transmitting condition.
Figure 24:
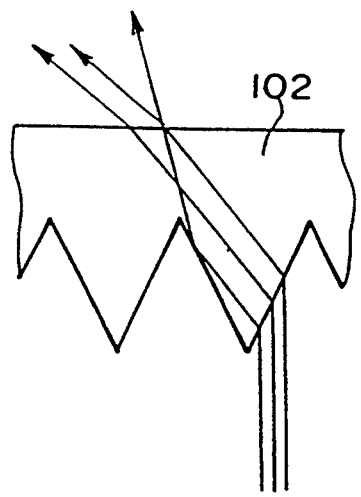

If $\tau > \delta$ in FIG. 13, a part of the incident light rays is reflected on the other inclined surface of the prism to change an advancing direction as shown in FIG. 24. As a result, the same outgoing angle $\beta$ cannot be obtained to cause a reduction in efficiency. Therefore, it is preferable that $n_2$ and $\delta$ are to be selected so as to satisfy $\tau \leq \delta$.

In the case that the two prism formed plates 101 and 102 are formed of the same material, $n_1 = n_2$ holds. Therefore, $\tau = \alpha$ and $\delta = \theta$ hold from the above equations (1) and (2), and the shapes of the prisms of the prism formed plates 101 and 102 become similar to each other. Further, under the conditions of the $\alpha \geq \theta$ and $\tau \leq \delta$, $\tau = \alpha = \delta = \theta$ holds. In this case, solving the above equation (1) for $\theta$, the following equation (3) is given.

$$\theta = \cos^{-1}\{[1+(1+8n_1^2)^{\frac{1}{2}}]/4n_1\} \qquad (3)$$

In the preferred embodiments shown in FIGS. 9 and 10, $\beta = 45°$ is set as previously mentioned. Accordingly, under the condition of $n_1 = n_2$, the above equation (3) gives $n_1 = n_2 = 1.538$. Thus, it is appreciated that a material having the refractive index of 1.538 is to be used for the prism formed plates 101 and 102. Further, in the case that the prism formed plates 101 and 102 are formed of different materials, the materials are to be selected so as to satisfy $n_1 \leq 1.538$ and $n_2 \geq 1.538$.

Figure 14:
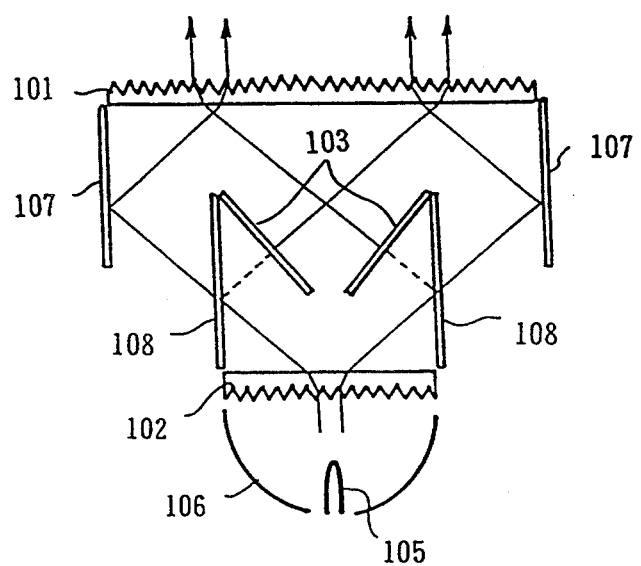

FIG. 14 shows a preferred embodiment employing two mirror type polarization beam splitters 108. The employment of the mirror type polarization beam splitters 108 allows arbitrary selection of the incident angle $\beta$. That is, the incident angle $\beta$ can be arbitrarily selected with the two reflecting mirrors 107 maintained in parallel relationship. In the preferred embodiment shown in FIG. 14, $\beta > 45°$ is set.

(III)

Figure 16:
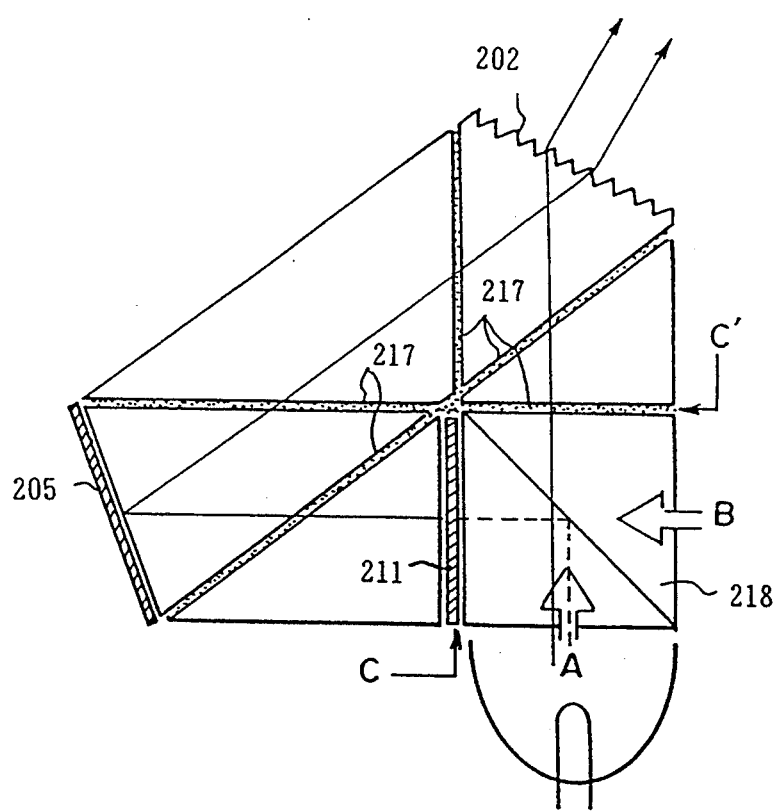
FIGS. 16 and 17 are plan views of the polarization forming optical device according to the third aspect of the present invention.
Figure 17:
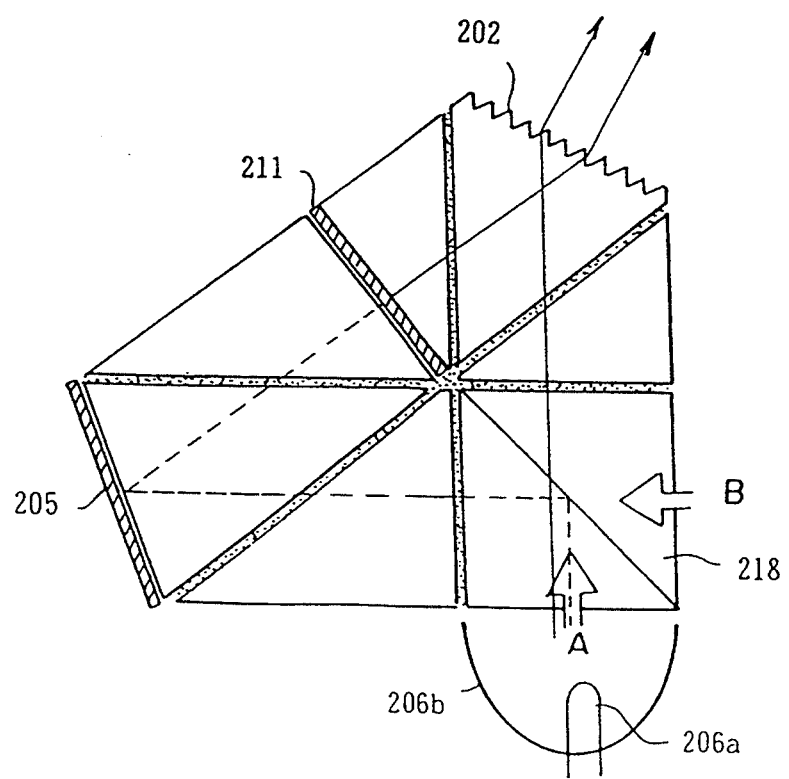

FIGS. 16 and 17 are plan views of preferred embodiments of the present invention.

Referring to FIG. 16, a p-polarization component of an incident light from A is transmitted through a polarization beam splitter 218, while an s-polarization component of the incident light is converted into a p-polarized light via the polarization beam splitter 218, a ½ wave plate 211 and a reflecting mirror 205. These p-polarized lights are synthesized by a synthesizer prism 202.

The preferred embodiment shown in FIG. 16 is constructed of the polarization beam splitter 218 and five triangular prisms inclusive of the synthesizer prism 202. These elements bonded together by adhesive 217 having a low refractive index. With this construction, a broadening light beam is enclosed in the prisms by total reflection to form a wave guide. Therefore, the light from the light source can be efficiently guided to the synthesizer prism 202. However, if a light source emitting a beam of a small broadening angle is used, the wave guide need not be formed but the device may be integrally formed.

The synthesizer prism 202 has a plurality of microprism rows on one surface thereof. An angle defined between optical axes of the two light beams incident on the synthesizer prism 202 is equally divided into two by a normal of the microprism formed surface of the synthesizer prism 202. A vertex angle of each microprism is so set as to satisfy the following equation (4) with reference to FIGS. 26 and 27.

$$n_3 \cos(\phi + \theta) = \cos \theta \quad (4)$$

where $n_3$ represents a refractive index of each microprism; $\theta$ represents a half of the vertex angle of each microprism; and $\phi$ represents an angle defined between the normal of the microprism formed surface and the optical axis of the incident light.

Figure 26:
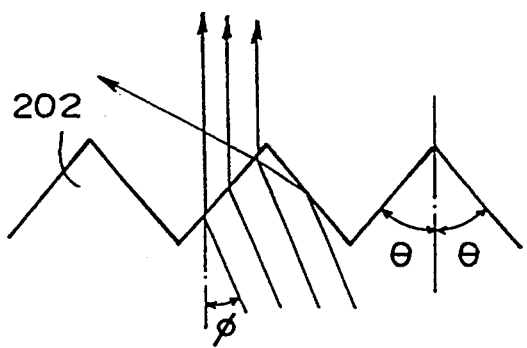
FIGS. 26 and 27 are enlarged plan views of a part of the synthesizer prism shown in FIGS. 16 and 17.
Figure 27:
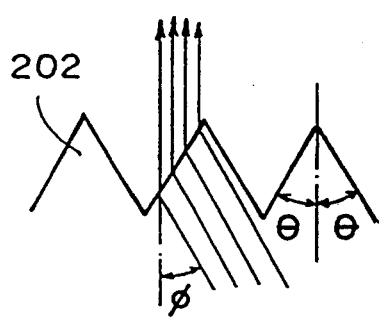

If $\theta > \phi$, a part of the rays of the incident light is reflected on the other inclined surface of each microprism to change an advancing direction as shown in FIG. 26. As a result, the rays of an outgoing light are not made parallel to cause a reduction in efficiency. Therefore, it is preferable that $n_3$, $\theta$ and $\phi$ are to be selected so as to satisfy $\theta < \phi$ or $\theta = \phi$ as shown in FIG. 27. In the preferred embodiments shown in FIGS. 16 and 17, $n_3 = 1.49$ and $\theta = \phi = 26.5°$ are set.

While a p-polarized outgoing light is obtained by the construction shown in FIG. 16, an s-polarized outgoing light can be obtained by changing the position of the light source from A to B or by changing the position of the ½ wave plate 211 from C to C'. In the case that both the positions are changed, a p-polarized outgoing light can be obtained.

The preferred embodiment shown in FIG. 17 is substantially the same in construction as the preferred embodiment shown in FIG. 16 except that the position of the ½ wave plate 211 is changed. The same operation as that in the preferred embodiment shown in FIG. 16 can be obtained.

(IV)

Figure 18:
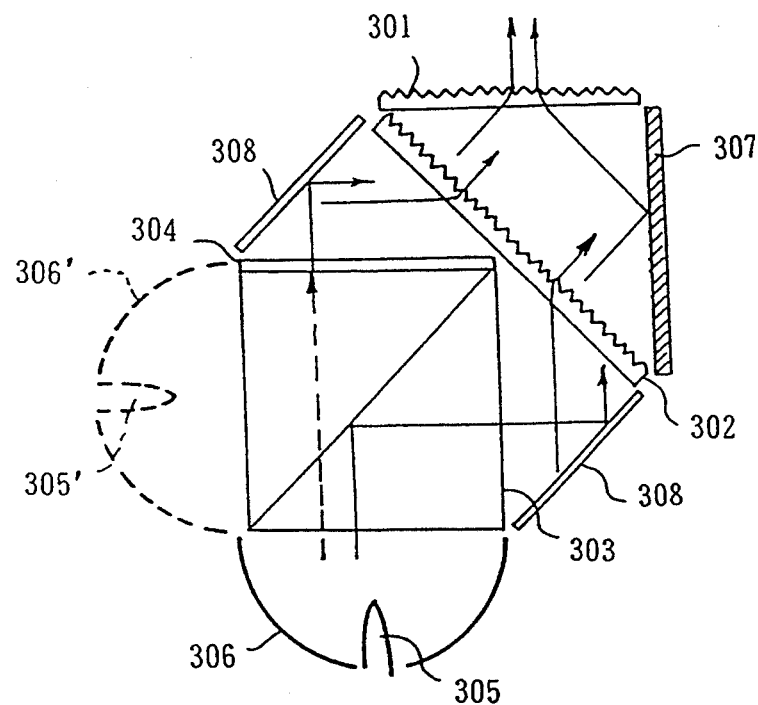
Figure 29:
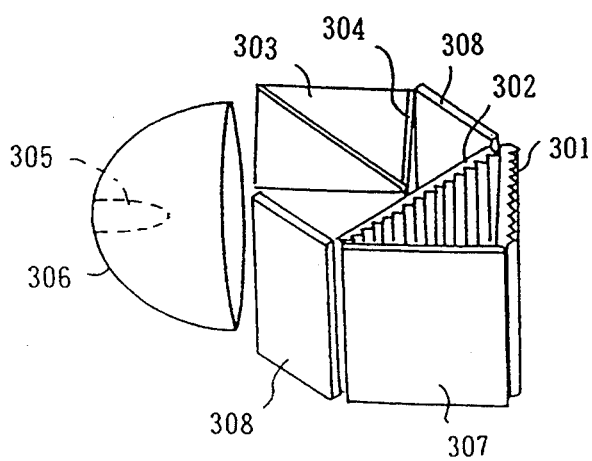
FIG. 29 is a perspective view of FIG. 18.

FIG. 18 is a plan view of a preferred embodiment of the present invention, and FIG. 29 is a perspective view of FIG. 18.

In the preferred embodiment shown in FIG. 18, rays of light from a light source 305 are made parallel by a curved mirror 306, and then enter a prism type polarization beam splitter 303 at an incident angle of 45°. A p-polarization component of the incident light is transmitted through the polarization beam splitter 303, and a plane of polarization of the p-polarization component is rotated at 90° by a ½ wave plate 304 to obtain an s-polarized light. A half of the s-polarized light thus obtained is reflected at 45° by a first reflecting mirror 308 to change an advancing direction at 90°, and then enters a half of a first prism formed plate 302, while the other half of the s-polarized light directly enters the half of the first prism formed plate 302. The incident light on the half of the first prism formed plate 302 is refracted by prisms of the first prism formed plate 302 to outgo therefrom. On the other hand, an s-polarization component of the incident light on the polarization beam splitter 303 is reflected by the polarization beam splitter 303. A half of the s-polarization component thus reflected by the polarization beam splitter 303 is further reflected at 45° by a second reflecting mirror 308 to change an advancing direction at 90°, and then enters the other half of the first prism formed plate 302, while the other half of the s-polarization component reflected by the polarization beam splitter 303 directly enters the other half of the first prism formed plate 302. The incident light on the other half of the first prism formed plate 302 is refracted by the prisms of the first prism formed plate 302 to outgo therefrom. The rays of the outgoing light from the first prism formed plate 302 can be made parallel by suitably selecting the shape and the refractive index of each prism of the first prism formed plate 302. The polarization beam splitter 303, the ½ wave plate 304, the first prism formed plate 302 and the reflecting mirrors 308 constitute the polarizing section according to the present invention.

The outgoing light from the half of the first prism formed plate 302 enters the whole of a second prism formed plate 301 at an incident angle of 45°, and is then refracted by prisms of the second prism formed plate 301 to outgo therefrom. On the other hand, the outgoing light from the other half of the first prism formed plate 302 enters the whole of a reflecting mirror 307 at an incident angle of 45° to change an advancing direction at 90°. The reflected light then enters the whole of the second prism formed plate 301 at an incident angle of 45°, and is then refracted by the prisms of the second prism formed plate 301 to outgo therefrom. The rays of the outgoing light from the second prism formed plate 301 can be made parallel by suitably selecting the shape and the refractive index of each prism of the second prism formed plate 301. A beam width of the outgoing light from the second prism formed plate 301 becomes identical with a beam width of the incident light from the light source 305. The reflecting mirror 307 and the second prism formed plate 301 constitute the light beam width reducing section according to the present invention.

The first prism formed plate 302 and the second prism formed plate 301 satisfy substantially the same conditions as those mentioned in relation to the prism formed plate shown in FIGS. 1, 2, 9 and 10. Further, the non-uniformity of the outgoing light from the polarizing section as previously mentioned with reference to FIG. 4 can be canceled by the mixing of the light in the beam width reducing section.

Figure 25:
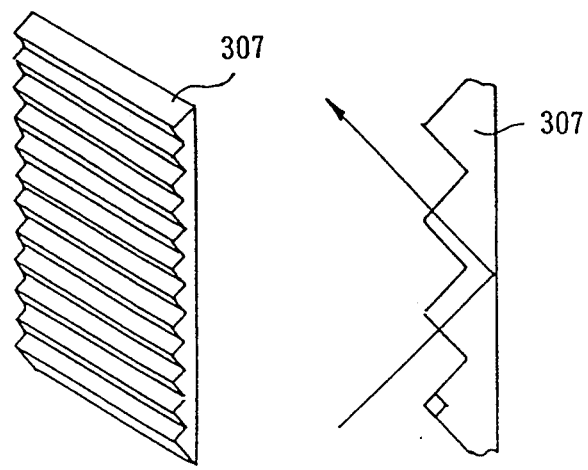
FIG. 25 is a view illustrating a modification of the reflecting mirror.

The reflecting mirror 307 employed in the preferred embodiment shown in FIG. 18 may be formed of a metal mirror or a dielectric multi-layer film. Alternatively, as shown in FIG. 25, the reflecting mirror 307 may be a total reflecting mirror utilizing that the incident angle and the reflection angle are 45°. That is, the total reflecting mirror is constructed of a transparent plate having a refractive index of $2^{\frac{1}{2}}$ or more and a plurality of rectangular prism rows formed on one surface of the transparent plate.

Figure 22:
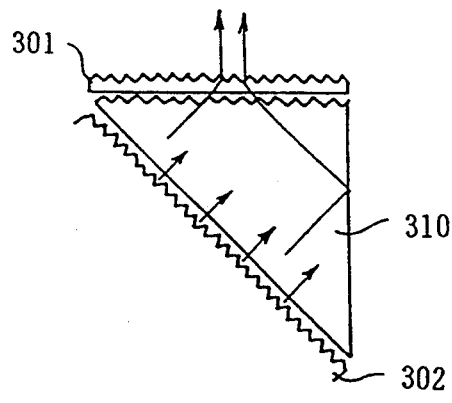
FIGS. 22 and 23 are plan views illustrating modifications of the reflecting mirror shown in FIG. 18.
Figure 23:
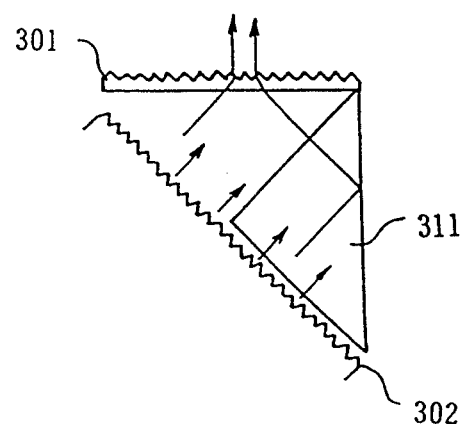

Similarly, the preferred embodiments shown in FIGS. 22 and 23 utilize a total reflecting mirror. In the preferred embodiment shown in FIG. 23, a rectangular prism 311 is employed. In the preferred embodiment shown in FIG. 22, a modified rectangular prism 310 having a plurality of rectangular microprism rows on a light outgoing surface thereof. This modified rectangular prism 310 also serves as a light conductor for conducting a total outgoing light from the first prism formed plate 302.

Such constructions as shown in FIGS. 22 and 23 may be applied to the reflecting mirrors 6 shown in FIGS. 1 to 3, the reflecting mirrors 107 shown in FIGS. 9 to 11, the reflecting mirrors 308 shown in FIGS. 18 to 21 and 29, and reflecting members 407 to be hereinafter described with reference to FIG. 34.

In the preferred embodiment shown in FIG. 18, the second prism formed plate 301 and the reflecting mirror 307 may be interchanged in position, so as to let the light beam outgo in a direction perpendicular to the direction of the incident light on the polarization beam splitter 303. Further, the positions of the light source 305 and the curved mirror 306 may be changed to the positions shown by 305' and 306', respectively, so as to obtain a p-polarized outgoing light.

Further, both the light sources 305 and 305' having different colors may be located to obtain polarized outgoing lights having different planes of polarization. Alternatively, the plane of polarization can be momentarily selected by locating both the light sources 305 and 305' and carrying out changeover of a switch (turning on either the light source 305 or 305' by operating the switch). Further, a degree of polarization can be continuously changed by changing a brightness of both of the light sources 305 and 305'. However, in the case that the TN liquid crystal cell is used in substitution for the $\frac{1}{2}$ wave plate, such special effects cannot be obtained because a plane of polarization of an incident light to the TN liquid crystal cell and a plane of polarization of an outgoing light from the TN liquid crystal cell must be specified.

The above-mentioned modifications can be applied to the preferred embodiments shown in FIGS. 1 to 3, 6, 7, 16 and 17. However, in the preferred embodiments employing a mirror type polarization beam splitter as shown in FIGS. 8 and 28, the modification that the light sources having different colors are located cannot be substantially applied because a wavelength band to be used is narrow.

Figure 28:
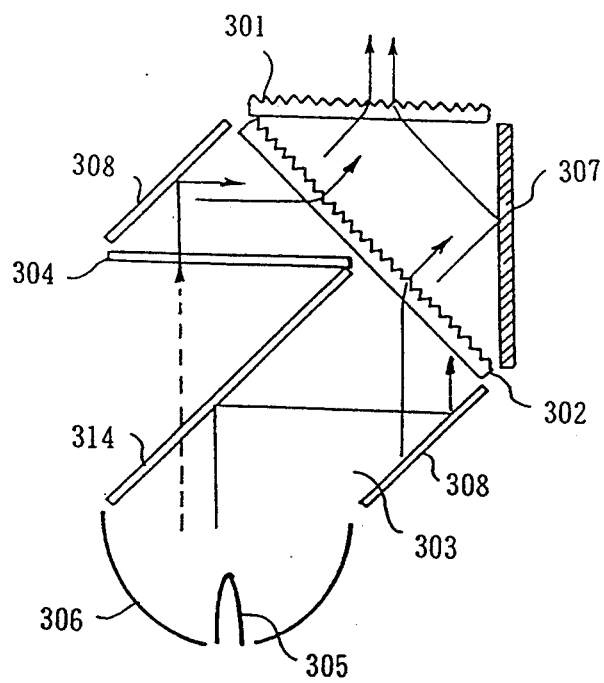

In FIG. 28, 314 denotes a mirror type polarization beam splitter.

Figure 19:
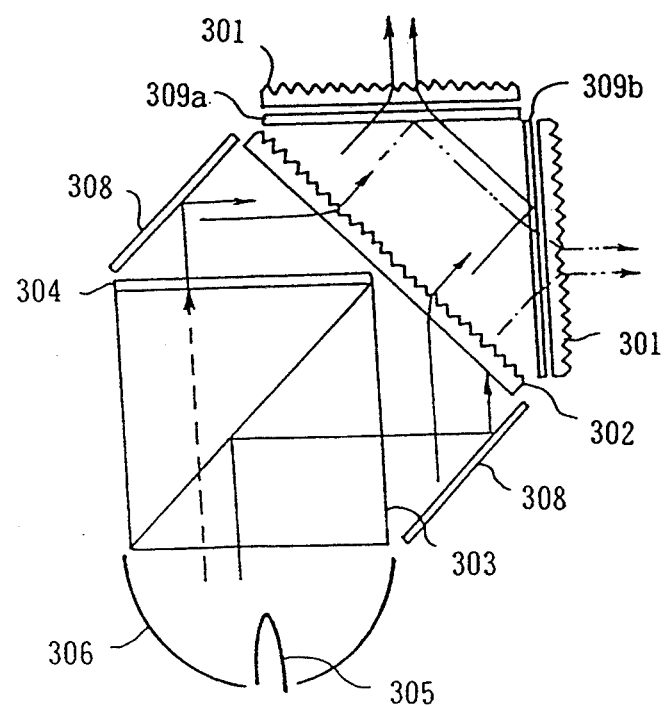

The preferred embodiment shown in FIG. 19 employs two second prism formed plates 301 and two dichroic mirrors 309a and 309b to have a function of color separation by utilizing a wide band property of the prism type polarization beam splitter. For example, in the case that the dichroic mirror 309a is a mirror which transmits a red light and reflects green and blue lights, and that the dichroic mirror 309b is a mirror which transmits green and blue lights and reflects a red light, a red polarized light and a cyan polarized light are obtained from the second prism formed plates 301, respectively.

The preferred embodiments shown in FIGS. 20 and 21 employ a plurality of prism type polarization beam splitters 303 and a plurality of $\frac{1}{2}$ wave plates 304, so as to reduce a total size and weight, thus making the device compact and light in weight.

(V)

Figure 34:
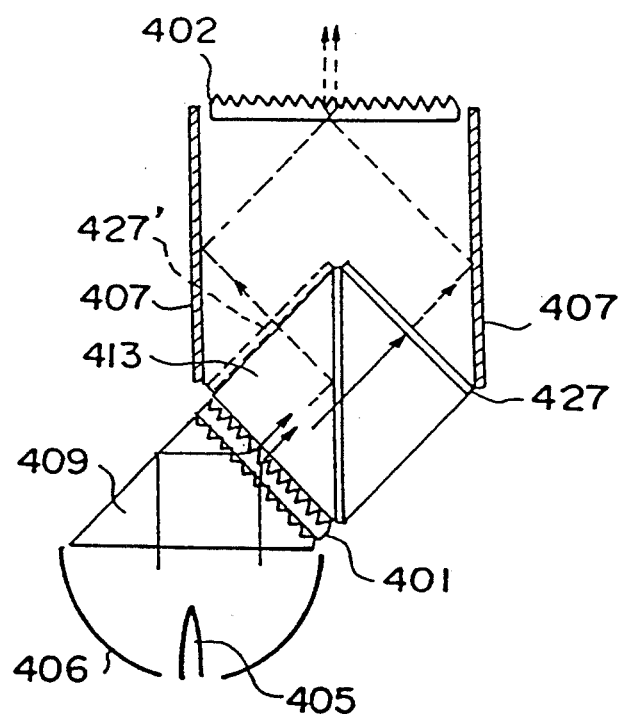
FIGS. 34 and 35 are plan views of the polarization forming optical device according to the fifth aspect of the present invention.

FIG. 34 is a plan view of a preferred embodiment of the present invention. While the light beam width reducing section is disposed behind the polarizing section in the previous preferred embodiments shown in FIGS. 18 to 21 and 28, the light beam width reducing section in this preferred embodiment shown in FIG. 34 is disposed before the polarizing section, in which a beam width of an outgoing polarized light is made equal to a beam width of an incident light similarly to the previous preferred embodiments.

In the preferred embodiment shown in FIG. 34, a prism type polarization beam splitter 413 is employed. Two outgoing light beams from the polarization beam splitter 413 are reflected by first and second reflecting members 407 to be guided to a second prism formed plate 402. With this arrangement, the beam width of the outgoing light from the polarizing section can be made equal to the beam width of the incident light to the light beam width reducing section.

The light beam width reducing section in this preferred embodiment employs a light conductor 409 formed from a rectangular prism having a plurality of microprism rows on a light outgoing surface thereof. The light conductor 409 has a total reflecting surface adjacent to the light outgoing surface.

A transmitting means 427 is attached to one of two light outgoing surfaces of the polarization beam splitter 413, so as to rotate a plane of polarization of the transmitted light through the polarization beam splitter 413 at 90°. That is, a p-polarization component of the outgoing light from a first prism formed plate 401 is transmitted through the polarization beam splitter 413, and is further transmitted through the transmitting means 427. Upon transmission through the transmitting means 427, the p-polarization component is converted into an s-polarized light by the rotation of the plane of polarization at 90°. On the other hand, an s-polarization component of the outgoing light from the first prism formed plate 401 is reflected by the polarization beam splitter 413. These two s-polarized lights are reflected by the reflecting members 407 to be guided to the second prism formed plate 402 to outgo therefrom in parallel.

While the outgoing light from the polarizing section is an s-polarized light in this preferred embodiment, a p-polarized outgoing light can be obtained by substituting a transmitting means 427' for the transmitting means 427 as shown in FIG. 34.

Figure 35:
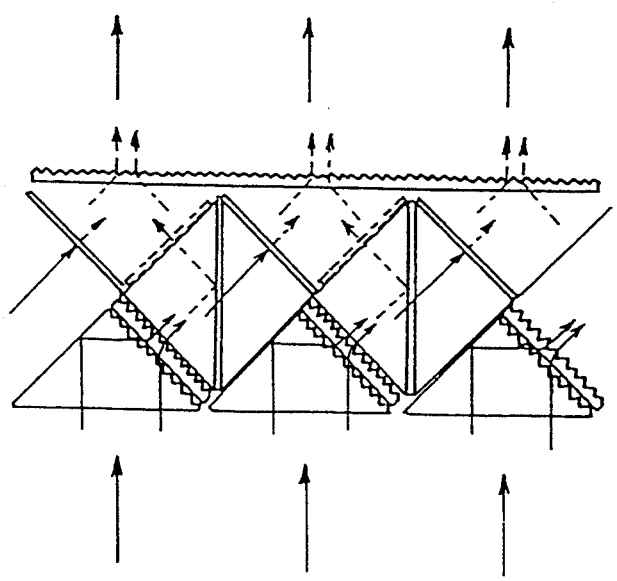

FIG. 35 is a plan view of a preferred embodiment of the present invention. This preferred embodiment is realized by juxtaposing a plurality of the device shown in FIG. 34 and eliminating the reflecting members 407. In the preferred embodiment shown in FIG. 35, a single second prism formed plate 402 is commonly used for the plural repeating units of the light beam width reducing sections and the polarizing sections, so that different incident light beams to the plural light beam width reducing sections are synthesized by the single second prism formed plate 402.

With this arrangement, a volume of the device as a whole can be remarkably reduced to realize a compact and lightweight construction.

The mirror type polarization beam splitter employed in the preferred embodiments shown in FIGS. 8, 14 and 28 is formed by coating a multi-layer of optical thin films on a transparent plate. The s-polarization component and the p-polarization component are separated from each other by utilizing that a reflectance of the s-polarization component is different from that of the p-polarization component. The application of the mirror type polarization beam splitter is limited to a monochromatic light because a wavelength band to be covered is narrow. However, the mirror type polarization beam splitter has an advantage that it is light in weight owing to its plate-like construction.

The prism type polarization beam splitter employed in the preferred embodiments shown in FIGS. 1 to 3, 6, 7, 9 to 12, 16 to 21, 29, 34 and 35 is formed by attaching two rectangular prisms together with a multi-layer polarizing film interposed therebetween. The splitter of this type can be used for a substantially entire wavelength band of a visible light, that is, a white light. The multi-layer polarizing film as mentioned above is a dielectric multi-layer film formed by alternately laminating a substance having a high refractive index and a substance having a low refractive index so as to obtain an angle of refraction equal to a Brewster's angle.

In the present invention, a polarization beam splitter shown in FIGS. 30 and 31 may be used.

The polarization beam splitter shown in FIGS. 30 and 31 is formed by interposing a multi-layer polarizing film 414 between two transparent plates each formed with rows of rectangular prism elements. The multi-layer polarizing film 414 is the same as that of the prism type polarization beam splitter as mentioned above. The surfaces of each prism element formed on each transparent plate has the same function as that of the incident surface, the reflecting surface and the outgoing surface of the prism type polarization beam splitter. Consequently, the polarization beam splitter shown in FIGS. 30 and 31 has the same function as that of the prism type polarization beam splitter. It is not preferable to apply the splitter as shown in FIGS. 30 and 31 to a coherent light such as a laser beam because coherence is disturbed. However, in the case where the splitter is applied to an incoherent light source as in the present invention, there is no problem.

Figure 32:
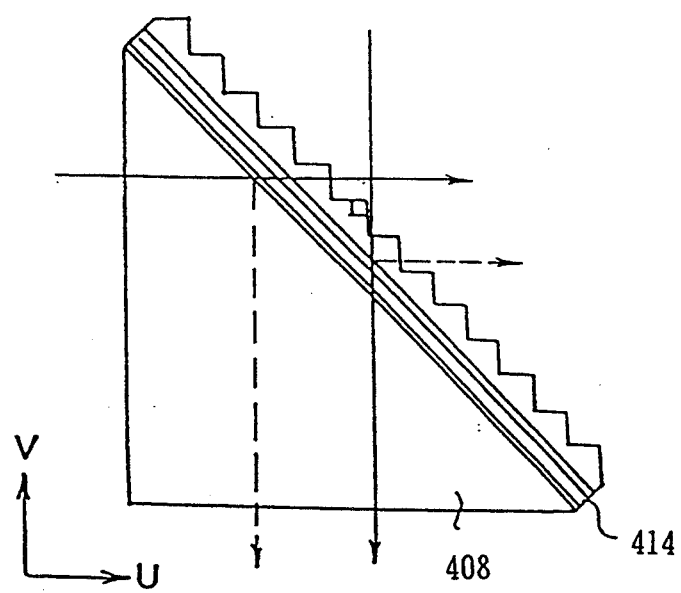
Figure 33:
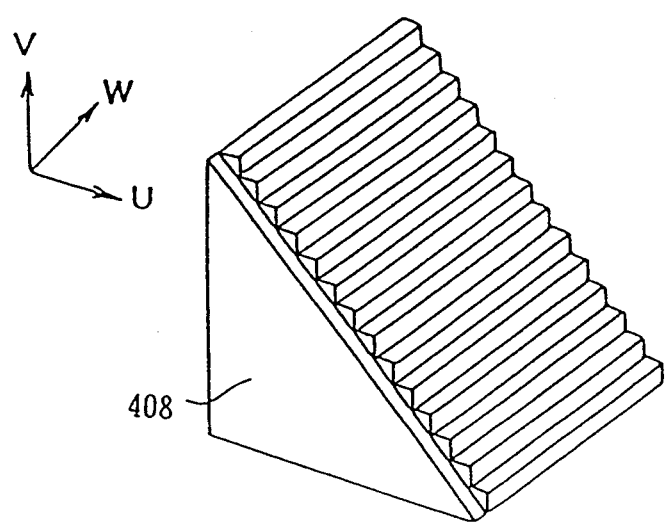

Further, in the present invention, a polarization beam splitter 408 shown in FIGS. 32 and 33 may be also be used.

The polarization beam splitter 408 shown in FIGS. 32 and 33 is constructed by substituting one of the transparent plates formed with the rows of the prism elements shown in FIGS. 30 and 31 for one of the rectangular prisms of the prism type polarization beam splitter. As easily appreciated, the function of the polarization beam splitter 408 is the same as that of the prism type polarization beam splitter.

A manufacturing method of the polarization beam splitters shown in FIGS. 30, 31, 32 and 33 is basically the same as that of the prism type polarization beam splitter. That is, the multi-layer polarizing film is formed on one of the transparent plates having the prism elements or on the prism by vapor deposition or the like, and then the other transparent plate having the prism elements is bonded to the multi-layer polarizing film.

Although the light source employed in the above-mentioned preferred embodiments is a beam light source using a curved mirror, it is to be easily understood that a beam light source using a lens may be employed as the light source according to the present invention.

Industrial Applicability

According to the present invention as described above, a linear polarized light can be efficiently formed from a random polarized light source without generating non-uniformity of brightness by using a compact and simple device.

Further, a linear polarized light can be efficiently formed from a random polarized light source by using a compact and simple device as suppressing the generation of non-uniformity of brightness.

Further, a linear polarized light can be efficiently formed from a random polarized light source by using a compact and simple device without expanding a beam width or with little expansion of a beam width.

What is claimed is:

1. A polarization forming optical device comprising a polarization beam splitter for reflecting one of a p-polarization component and an s-polarization component of light emitted from a light source and for transmitting the other; transmitting means for rotating a plane of polarization of one of a reflected light and a transmitted light from said polarization beam splitter at 90°; a prism formed plate having a plurality of prism rows on one surface thereof for transmitting and synthesizing the reflected light and the transmitted light as two divided light beams from said polarization beam splitter; and first and second light reflecting means for guiding said two divided light beams from said polarization beam splitter to said prism formed plate on an opposite side of said one surface formed with said prism rows, so as to overlap the reflected light and the transmitted light each other on the other surface of said prism formed plate;

the shape of each prism of said prism formed plate and the arrangement of said polarization beam splitter, said reflecting means and said prism formed plate being designed in such a manner that the reflected light and the transmitted light each enter said prism formed plate with one angle relative to a normal of said prism formed plate smaller than 60°, an outgoing light beam parallel to the normal of said prism formed plate is obtained and also an angle $\Theta$ defined between a surface of each prism and the normal of said prism formed plate and an angle $\alpha$ defined between an advancing direction of light beam in said prism formed plate and the normal of said prism formed plate are so selected as to substantially satisfy the following relationship $n\cos(\alpha+\Theta)=\cos\Theta$ $\alpha \geq \Theta$ wherein n represents a refractive index of said prism formed plate, thereby obtaining an increasing ratio in width of the outgoing light beam to the reflected light and the transmitted light smaller than 2 under the condition of substantially no loss of light.

2. The polarization forming optical device as defined in claim 1, wherein said transmitting means is a ½ wave plate.

3. The polarization forming optical device as defined in claim 1, wherein said transmitting means is a TN liquid crystal cell.

4. A polarization forming optical device comprising a polarization beam splitter for reflecting one of a p-polarization component and an s-polarization component of light emitted from a light source and for transmitting the other; transmitting means for transmitting a reflected light or a transmitted light from said polarization beam splitter and for rotating a plane of polarization of an incident light at 90°; a reflecting mirror for changing an advancing direction of one of said reflected light and said transmitted light from said polarization beam splitter in such a manner that said reflected light intersects said transmitted light: and a prism having a plurality of prism rows on one surface thereof for refracting said reflected light and said transmitted light intersected to make advancing directions of these two lights coincident with each other, to allow the lights to go out from said one surface formed with said prism rows and to thereby synthesize the lights;

the shape of each prism of said prism and the arrangement of said polarization beam splitter, said reflecting mirror and said prism being designed in such a manner that the reflected light and the transmitted light each enter said prism with one angle relative to a normal of said one surface smaller than 60°, an outgoing light beam parallel to the normal of said one surface of said prism is obtained and also an angle Θ defined between a surface of each prism and the normal of said one surface of said prism and an angle e defined between an advancing direction of light beam in said prism and the normal of said one surface of said prism are so selected as to substantially satisfy the following relationship $$n\cos(\alpha+\Theta)=\cos\Theta$$

$$\alpha\geq\Theta$$

wherein n represents a refractive index of said prism, thereby obtaining an increasing ratio in width of the outgoing light beam to the reflected light and the transmitted light smaller than 2 under the condition of substantially no loss of light.

5. The polarization forming optical device as defined in claim 4, wherein said transmitting means is a ½ wave plate.

6. The polarization forming optical device as defined in claim 4, wherein said transmitting means is a TN liquid crystal cell.

7. A polarization forming optical device comprising a polarizing section and a light beam width reducing section, wherein:

said polarizing section comprises a polarization beam splitter for reflecting one of a p-polarization component and an s-polarization component of light emitted from a light source and for transmitting the other; transmitting means for transmitting one of a reflected light and a transmitted light from said polarization beam splitter and for rotating a plane of polarization at 90°; a first prism formed plate having one surface formed with a plurality of prism rows for making an advancing direction of a transmitted light from said transmitting means coincident with an advancing direction of the other of said reflected light and said transmitted light from said polarization beam splitter to synthesize the two light beams from said transmitting means and said polarization beam splitter; and a pair of reflectors for reflecting a part of the other of said reflected light and said transmitted light from said polarization beam splitter and also for reflecting a part of said transmitted light from said transmitting means, so as to guide both the parts to said first prism formed plate; and said light beam width reducing section comprises a reflecting surface for reflecting at least one part of a synthesized light from said first prism formed plate; and a second prism formed plate having one surface formed with a plurality of prism rows for making an advancing direction of a reflected light from said reflecting surface coincident with an advancing direction of the other part of said synthesized light from said first prism formed plate to synthesize said reflected light and said other part.

8. The polarization forming optical device as defined in claim 7, wherein said transmitting means is a ½ wave plate.

9. The polarization forming optical device as defined in claim 7, wherein said transmitting means is a TN liquid crystal cell.

10. A polarization forming optical device comprising a light beam width reducing section and a polarizing section, wherein:

said light beam width reducing section comprises a reflecting member for reflecting a part of light emitted from a light source; and a first prism formed plate having one surface formed with a plurality of prism rows for making an advancing direction of a reflected light from said reflecting member coincident with an advancing direction of the other part of said light from said light source to synthesize said reflected light and said other part; and said polarizing section comprises a polarization beam splitter for reflecting one of a p-polarization component and an s-polarization component of a synthesized light from said light beam width reducing section and for transmitting the other; transmitting means for receiving one of a reflected light and a transmitted light from said polarization beam splitter and for rotating a plane of polarization at 90° to obtain a transmitted light component; a second prism formed plate having one surface formed with a plurality of prism rows for making an advancing direction of said transmitted light component from said transmitting means coincident with an advancing direction of the other of said reflected light and said transmitted light from said polarization beam splitter to synthesize said transmitted light component and said other; and a reflecting member for conducting at least one part of said transmitted light component from said transmitting means and at least one part of said other of said reflected light and said transmitted light from said polarization beam splitter.

11. The polarization forming optical device as defined in claim 10, wherein said transmitting means is a ½ wave plate.

12. The polarization forming optical device as defined in claim 10, wherein said transmitting means is a TN liquid crystal cell.

13. A polarization forming optical device comprising a plurality of repeating units, wherein:
   each repeating unit comprises a light beam width reducing section and a polarizing section,
   said light beam width reducing section comprises a reflecting member for reflecting a part of light emitted from a light source; and a first prism formed plate having one surface formed with a plurality of prism rows for making an advancing direction of a reflected light from said reflecting member coincident with an advancing direction of the other part of said light from said light source to synthesize said reflected light and said other part;
   said polarizing section comprises a polarization beam splitter for reflecting one of a p-polarization component and an s-polarization component of a synthesized light from said light beam width reducing section and for transmitting the other; transmitting means for receiving one of a reflected light and a transmitted light from said polarization beam splitter and for rotating a plane of polarization at 90° to obtain a transmitted light component; and a second prism formed plate having one surface formed with a plurality of prism rows for making an advancing direction of said transmitted light component from said transmitting means coincident with an advancing direction of the other of said reflected light and said transmitted light from said polarization beam splitter to synthesize said transmitted light component and said other; and
   said plurality of repeating units are juxtaposed so as to make the outgoing light beams from the light beam width reducing sections of the repeating units parallel to one another.

14. The polarization forming optical device as defined in anyone of claims 1 to 13, wherein said polarization beam splitter comprises two transparent plates and a multi-layer polarizing film interposed between said two transparent plates, each of said transparent plates being formed on its outer side surface with a plurality of prisms arranged in parallel rows, each of said prisms having two adjacent surfaces inclined at 45° with respect to a normal to an inner side surface of each said transparent plate and inclined at 90° with respect to each other.

15. The polarization forming optical device as defined in anyone of claims 1 to 13, wherein said polarization beam splitter comprises a single transparent plate, a rectangular prism and a multi-layer polarizing film interposed between an inner side surface of said transparent plate and a slant surface of said rectangular prism, said transparent plate being formed on its outer side surface with a plurality of prisms arranged in parallel rows, each of said prisms having two adjacent surfaces inclined at 45° with respect to a normal to said inner side surface of said transparent plate and inclined at 90° with respect to each other.

* * * * *

UNITED STATES PATENT AND TRADEMARK OFFICE
CERTIFICATE OF CORRECTION

PATENT NO.  : 5,359,455
DATED       : October 25, 1994
INVENTOR(S) : Noriji Oishi It is certified that error appears in the above-identified patent and that said Letters Patent is hereby corrected as shown below:

In column 17, claim 4, line 41, replace "angle e" with --angle $\alpha$--.

Signed and Sealed this

Twentieth Day of December, 1994

Attest:

BRUCE LEHMAN

*Attesting Officer*    *Commissioner of Patents and Trademarks*